US012269267B2

(12) United States Patent
Takabe et al.

(10) Patent No.: US 12,269,267 B2
(45) Date of Patent: Apr. 8, 2025

(54) LIQUID EJECTING HEAD, LIQUID EJECTING APPARATUS, AND METHOD OF MANUFACTURING LIQUID EJECTING HEAD

(71) Applicant: SEIKO EPSON CORPORATION, Tokyo (JP)

(72) Inventors: Motoki Takabe, Shiojiri (JP); Yu Shiozawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 151 days.

(21) Appl. No.: 18/098,163

(22) Filed: Jan. 18, 2023

(65) Prior Publication Data

US 2023/0226820 A1 Jul. 20, 2023

(30) Foreign Application Priority Data

Jan. 19, 2022 (JP) ................................ 2022-006111

(51) Int. Cl.
*B41J 2/14* (2006.01)
*B41J 2/16* (2006.01)

(52) U.S. Cl.
CPC ............. *B41J 2/1433* (2013.01); *B41J 2/162* (2013.01); *B41J 2/1629* (2013.01); *B41J 2002/14467* (2013.01); *B41J 2002/14475* (2013.01)

(58) Field of Classification Search
CPC ........ B41J 2/1433; B41J 2/162; B41J 2/1629; B41J 2002/14467; B41J 2002/14475; B41J 2/1628; B41J 2002/14362; B41J 2202/11; B41J 2202/12; B41J 2/161; B41J 2/1623; B41J 2002/14241; B41J 2/14233
See application file for complete search history.

(56) References Cited

U.S. PATENT DOCUMENTS

2019/0389217 A1* 12/2019 Naganuma ............. B41J 2/1646

FOREIGN PATENT DOCUMENTS

JP 2014-124887 A 7/2014
JP 2018196930 A * 12/2018

OTHER PUBLICATIONS

Naganuma Yoichi et al., Liquid Injection Head and Liquid Injection Device (JP 2018196930 A), Dec. 13, 2018, [Description of Embodiments: Embodiments 1, 2, 3, Production method, Other embodiments] (Year: 2018).*

* cited by examiner

*Primary Examiner* — Lisa Solomon
(74) *Attorney, Agent, or Firm* — Harness, Dickey & Pierce, P.L.C.

(57) ABSTRACT

A bonding substrate is provided with nozzle communication channels that establish communication between pressure chambers and nozzles. Each nozzle communication channel includes a pair of first inner wall surfaces constituting wall surfaces in a first direction, and a pair of second inner wall surfaces constituting wall surfaces in a second direction being orthogonal to the first direction. At least one of the second inner wall surfaces includes an inclined surface being inclined such that a length of the nozzle communication channel becomes gradually shorter toward the nozzle. An angle of the inclined surface relative to a liquid ejecting surface where the nozzles are opened is smaller than an angle of the first inner wall surface relative to the liquid ejecting surface.

20 Claims, 9 Drawing Sheets

LIQUID EJECTING HEAD, LIQUID EJECTING APPARATUS, AND METHOD OF MANUFACTURING LIQUID EJECTING HEAD

The present application is based on, and claims priority from JP Application Serial Number 2022-006111, filed Jan. 19, 2022, the disclosure of which is hereby incorporated by reference herein in its entirety.

BACKGROUND

1. Technical Field

The present disclosure relates to a liquid ejecting head and a liquid ejecting apparatus configured to eject a liquid from a nozzle, and a method of manufacturing a liquid ejecting head, or more specifically, to an ink jet recording head and an ink jet recording apparatus configured to eject an ink as a liquid, and a method of manufacturing an ink jet recording head.

2. Related Art

There has been an ink jet recording head serving as a representative example of a liquid ejecting head to eject liquid droplets, which includes a nozzle and a flow channel of a pressure chamber or the like communicating with the nozzle, and is configured to eject ink droplets from the nozzle by generating a change in pressure of the ink in the pressure chamber by using a pressure generation unit, for example.

An example of the ink jet recording head is configured to couple the pressure chamber to the nozzle through a nozzle communication channel being a straight hole (see JP-A-2014-124887). JP-A-2014-124887 discloses a configuration in which a flow channel forming substrate provided with the pressure chambers is bonded to a nozzle plate provided with the nozzles while interposing a communication plate in between. Here, the communication plate is provided with nozzle communication channels each having a larger diameter than that of the nozzles.

Here, in the above-described configuration in which the pressure chamber is coupled to the nozzle through the nozzle communication channel, shapes of openings of both the pressure chamber and the nozzle communication channel at a coupling portion therebetween are different from each other, and shapes of openings of both the nozzle communication channel and the nozzle at a coupling portion therebetween are different from each other, and steps are therefore prone to be formed at the coupling portion between the nozzle communication channel and the pressure chamber and at the coupling portion between the nozzle communication channel and the nozzle. For this reason, there has been a problem that bubbles are likely to be accumulated in the vicinity of the nozzle communication channel such as the coupling portion between the nozzle communication channel and the pressure chamber and the coupling portion between the nozzle communication channel and the nozzle.

The aforementioned problem exists not only in the ink jet recording head but also in liquid ejecting heads configured to eject various liquids.

SUMMARY

A liquid ejecting head according to an aspect of the present disclosure includes: a flow channel forming substrate including a plurality of pressure chambers arranged in a first direction; and a bonding substrate bonded to one surface side of the flow channel forming substrate, the bonding substrate at least including a nozzle plate provided with nozzles coupled to the pressure chambers, in which the bonding substrate is provided with nozzle communication channels configured to establish communication between the pressure chambers and the nozzles, the nozzle communication channel includes a pair of first inner wall surfaces constituting wall surfaces in the first direction, and a pair of second inner wall surfaces constituting wall surfaces in a second direction being orthogonal to the first direction, at least one of the second inner wall surfaces includes an inclined surface being inclined such that a length in the second direction of the nozzle communication channel becomes gradually shorter toward the nozzle, and an angle of the inclined surface relative to a liquid ejecting surface on which the nozzle is opened is smaller than an angle of the first inner wall surface relative to the liquid ejecting surface.

A liquid ejecting apparatus according to another aspect of the present disclosure includes the liquid ejecting head according to the above-described aspect.

A method of manufacturing a liquid ejecting head according to still another aspect of the present disclosure is a method of manufacturing a liquid ejecting head provided with a flow channel forming substrate including a plurality of pressure chambers arranged in a first direction, and a bonding substrate bonded to one surface side of the flow channel forming substrate, the bonding substrate at least including a nozzle plate provided with nozzles coupled to the pressure chambers, in which the bonding substrate is provided with nozzle communication channels configured to establish communication between the pressure chambers and the nozzles, the nozzle communication channel includes a pair of first inner wall surfaces constituting wall surfaces in the first direction, and a pair of second inner wall surfaces constituting wall surfaces in a second direction being orthogonal to the first direction, at least one of the second inner wall surfaces includes an inclined surface being inclined such that a length in the second direction of the nozzle communication channel becomes gradually shorter toward the nozzle, and an angle of the inclined surface relative to a liquid ejecting surface on which the nozzle is opened is smaller than an angle of the first inner wall surface relative to the liquid ejecting surface, the method including: forming the bonding substrate from a single-crystal silicon substrate having a surface with a plane orientation of {100} plane; and forming the nozzle communication channels by subjecting the single-crystal silicon substrate to anisotropic wet etching.

DESCRIPTION OF EXEMPLARY EMBODIMENTS

Figure 1:
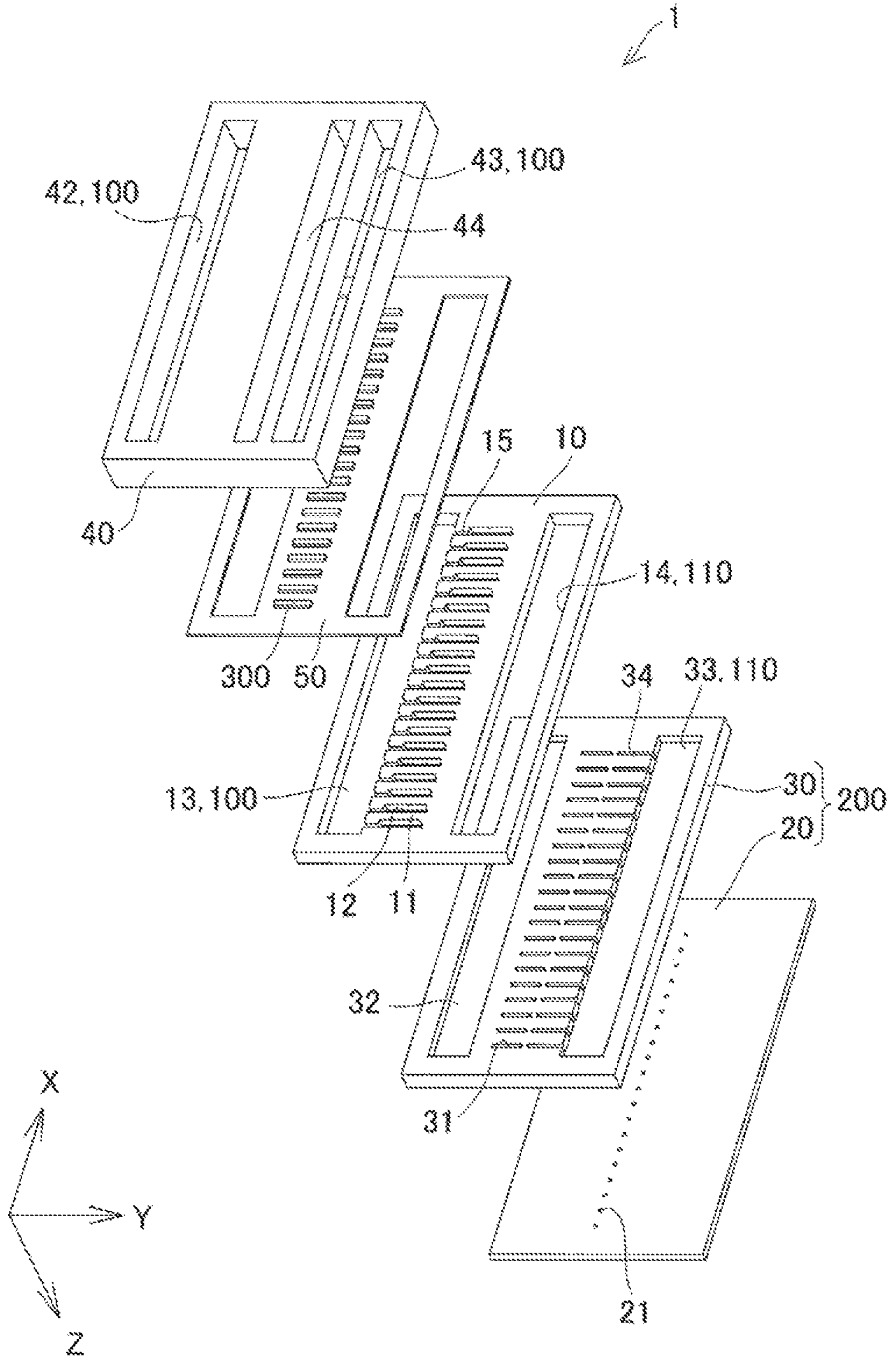
FIG. 1 is an exploded perspective view of an ink jet recording head according to Embodiment 1.

The present disclosure will be described below in detail based on embodiments. It is to be noted, however, that the following description explains certain aspects of the present disclosure and the configuration of the present disclosure can be changed as desired within the scope of the present disclosure. The same constituents in the drawings are denoted by the same reference signs and overlapping explanations thereof will be omitted.

Signs x, y, and z in the respective drawings represent three spatial axes that are orthogonal to one another. In this specification, directions along these axes will be referred to as x direction, y direction, and z direction, respectively. A direction indicated by an arrow in each drawing will be explained as a positive (+) direction and an opposite direction to the arrow will be explained as a negative (−) direction. The z direction represents a vertical direction. Here, +z direction represents vertically downward and −z direction represents vertically upward. In addition, the three spatial axes of the x, y, and z axes not specified as either the positive direction or the negative direction will be described as the x axis, the y axis, and the z axis, respectively.

Embodiment 1

Figure 2:
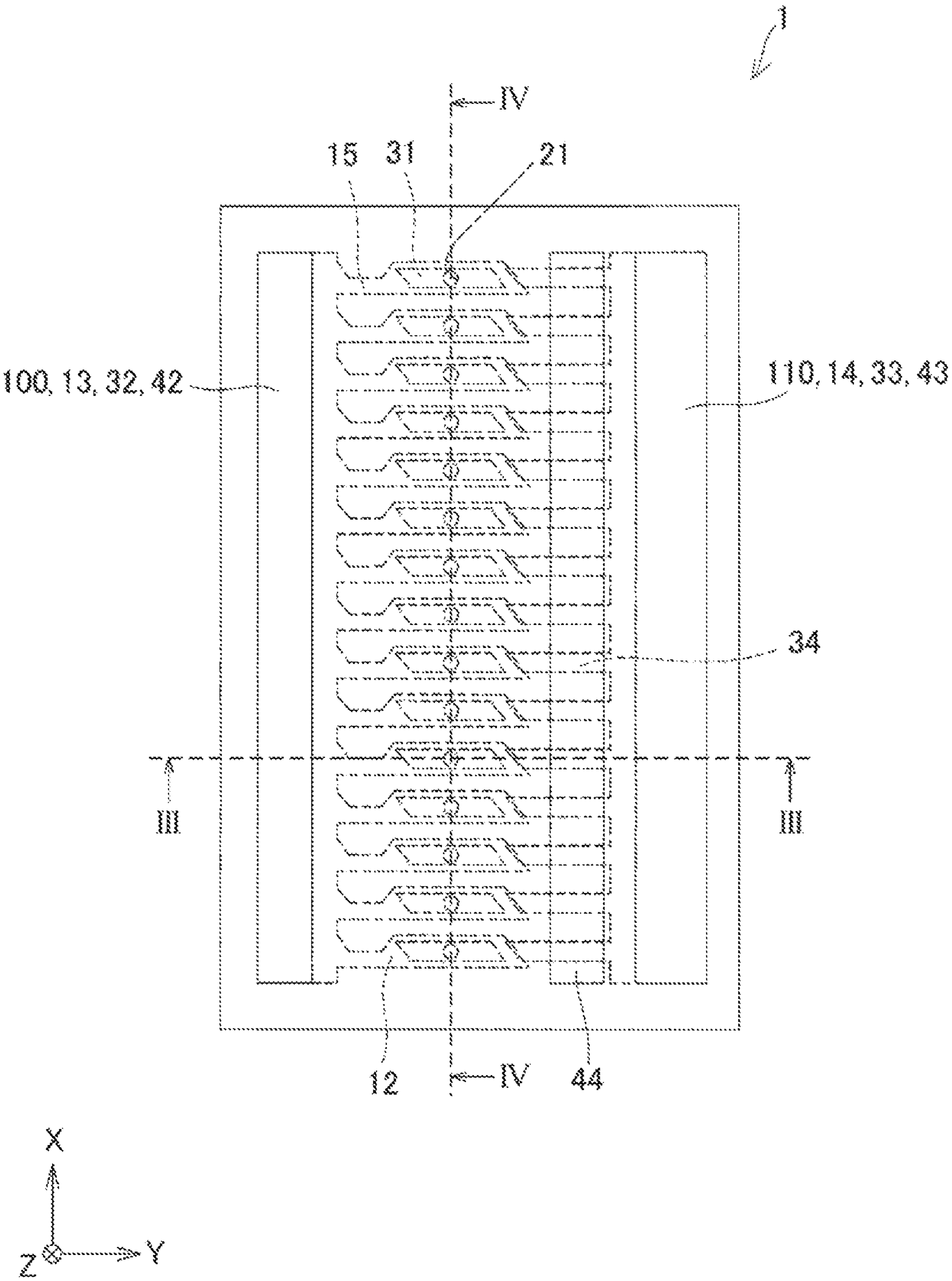
FIG. 2 is a plan view of the ink jet recording head according to the Embodiment 1.
Figure 3:
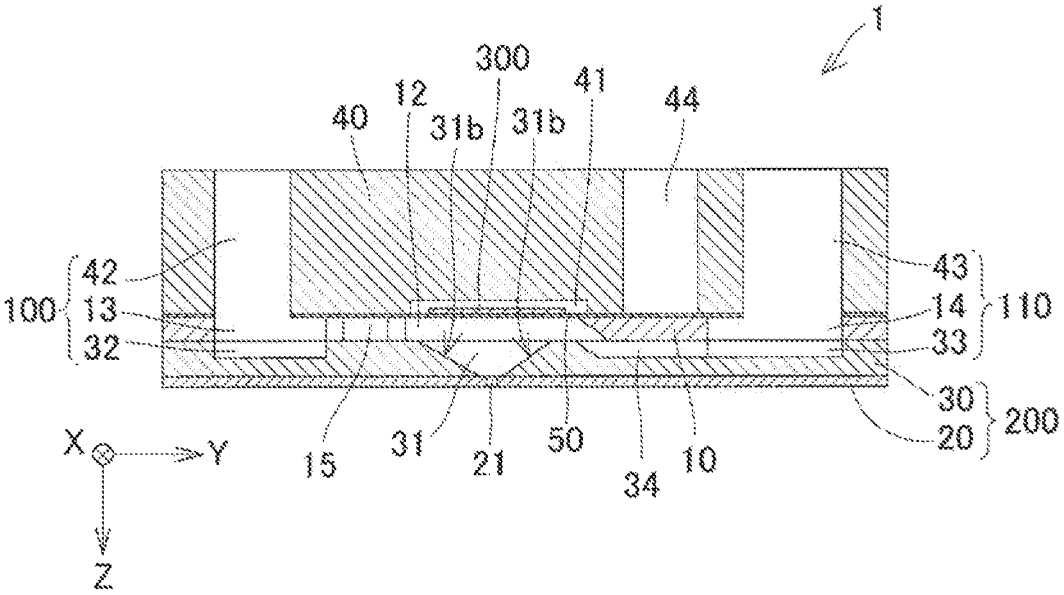
FIG. 3 is a sectional view of the ink jet recording head according to the Embodiment 1.
Figure 4:
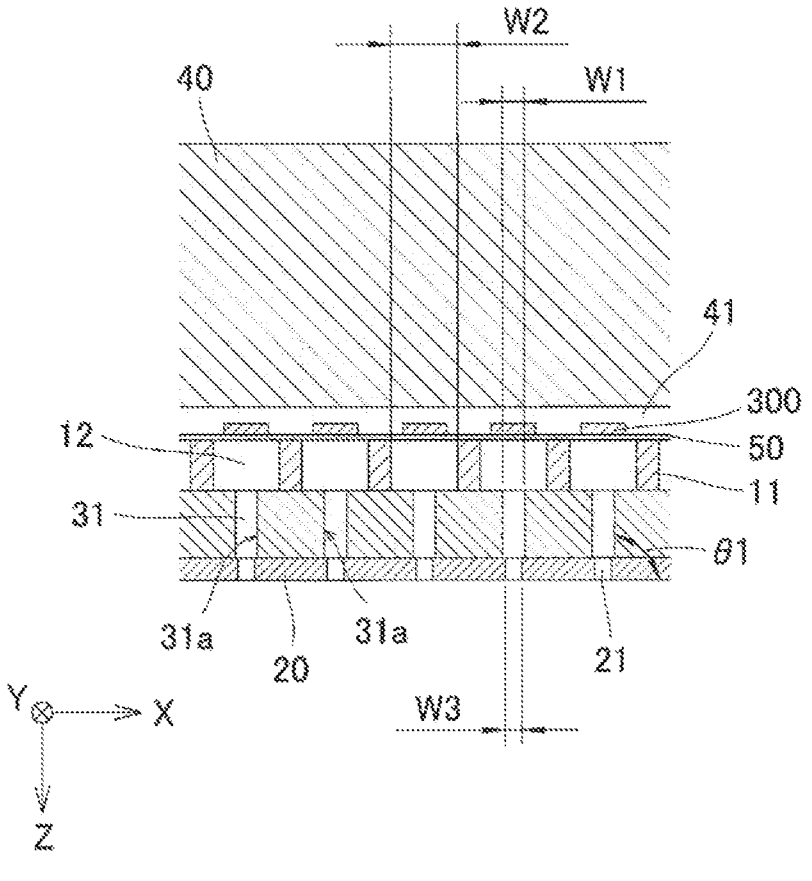
FIG. 4 is another sectional view of the ink jet recording head according to the Embodiment 1.
Figure 5:
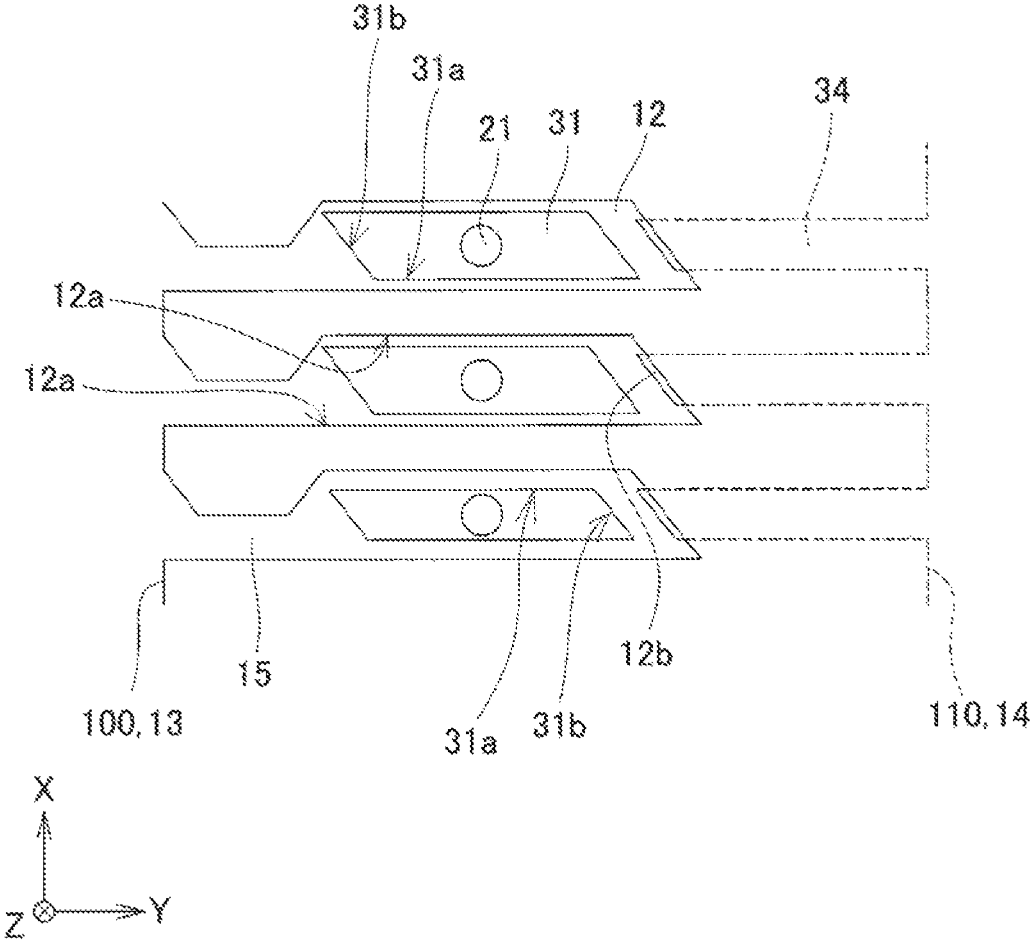
FIG. 5 is an enlarged plan view illustrating a principal part of the ink jet recording head according to the Embodiment 1.
Figure 6:
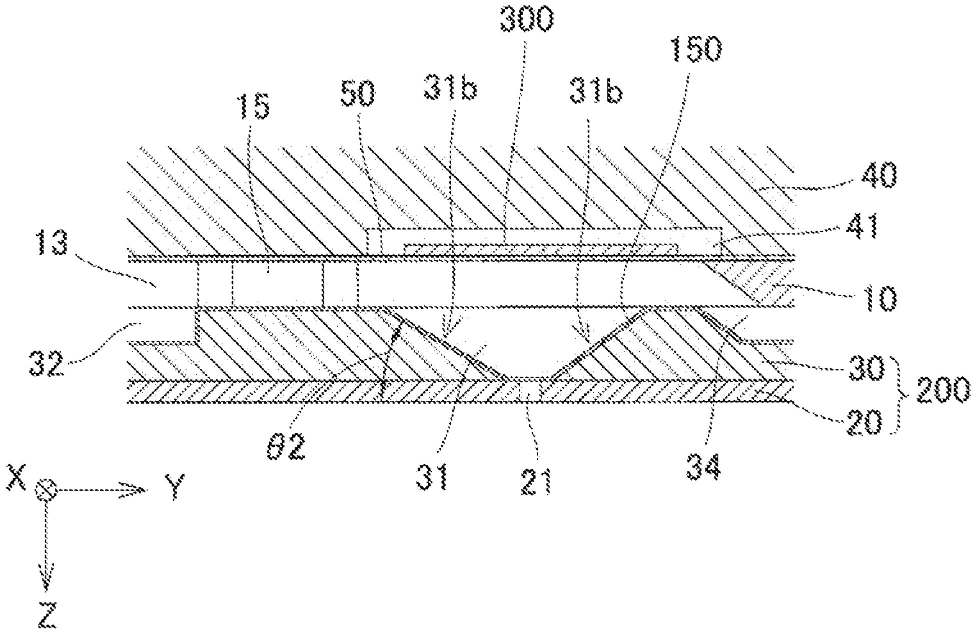
FIG. 6 is an enlarged sectional view illustrating the principal part of the ink jet recording head according to the Embodiment 1.

FIG. 1 is an exploded perspective view illustrating a principal structure of an ink jet recording head that represents an example of a liquid ejecting head according to Embodiment 1 of the present disclosure. FIG. 2 is a plan view of the ink jet recording head viewed from the −z direction side. FIG. 3 is a sectional view of the ink jet recording head, which is a sectional view corresponding to line III-III in FIG. 2. FIG. 4 is a sectional view of the ink jet recording head, which is a sectional view corresponding to line IV-IV in FIG. 2. FIG. 5 is an enlarged plan view of a flow channel forming substrate and a bonding substrate viewed from the −z direction side, which is a view for explaining pressure chambers and nozzle communication channels. FIG. 6 is an enlarged sectional view illustrating the vicinity of an ink communicating portion of the ink jet recording head.

As illustrated in the drawings, an ink jet recording head (hereinafter also simply referred to as a recording head) 1 that represents an example of the liquid ejecting head of the present embodiment is configured to eject an ink being a liquid in the z-axis direction, or more specifically, in the +z direction.

This recording head 1 includes a flow channel forming substrate 10 in which ink flow channels to circulate the ink are to be formed. For example, this flow channel forming substrate 10 is formed from a single-crystal silicon substrate having a surface with a plane orientation of {110} plane, which is a single-crystal silicon substrate having a surface with a plane orientation of (110) plane in the present embodiment. In other words, the flow channel forming substrate 10 is formed from the single-crystal silicon substrate that is preferentially oriented to (110) plane.

Here, the single-crystal silicon substrate having the surface with the plane orientation of {110} plane not only includes the single-crystal silicon substrate having the surface with the plane orientation of (110) plane, but also includes, for example, single-crystal silicon substrates having surfaces with plane orientations of (101) plane, (011) plane, (−110) plane, (−101) plane, (0-11) plane, and so forth. That is to say, the single-crystal silicon substrate having the surface with the plane orientation of {110} plane includes the single-crystal silicon substrates having the surfaces with the plane orientations equivalent to (110) plane.

Note that a material of the flow channel forming substrate 10 is not limited only to the single-crystal silicon substrate having the surface with the plane orientation of {110} plane. For example, the material may be a single-crystal silicon substrate having a surface with a plane orientation of {100} plane. In addition, the material may be other silicon substrates such as a polycrystalline silicon substrate, an SOI substrate, a glass substrate, various ceramic substrates, and the like.

In the flow channel forming substrate 10, pressure chambers 12 constituting ink flow channels are arranged in a line along the x-axis direction being a first direction intersecting with the z-axis direction. Every two pressure chambers 12 adjacent to each other are divided by a partition wall 11. Although a shape of an opening of each pressure chamber 12 is not limited to a particular shape, the opening is formed substantially into a parallelogram in which a length in the y-axis direction is larger than a length in the x-axis direction in plan view, for example.

In the present embodiment, the flow channel forming substrate 10 is formed from the single-crystal silicon substrate having the surface with the plane orientation of (110) plane as mentioned above, and each pressure chamber 12 is formed by subjecting this single-crystal silicon substrate constituting the flow channel forming substrate 10 to anisotropic wet etching. For this reason, the shape of the opening of each pressure chamber 12 is formed substantially into the parallelogram as illustrated in FIG. 5.

Moreover, a first inner wall surface **12*a* on a long side of each pressure chamber 12 is formed from first (111) plane which is perpendicular to a surface of the flow channel forming substrate 10 having (110) plane, and a second inner wall surface 12*b* on a short side thereof is formed from second (111) plane which is perpendicular to (110) plane and intersects with the first (111) plane at a predetermined angle. Specifically, the first inner wall surface 12*a* constituting the wall surface in the x-axis direction of the pressure chamber 12 is formed from the first (111) plane and the second inner wall surface 12*b*** constituting the wall surface in the y-axis direction is formed from the second (111) plane.

In addition to the pressure chambers 12, the recording head 1 includes a supply manifold 100 representing a first common liquid chamber, and a circulation manifold 110 representing a second common liquid chamber, which are common to these pressure chambers 12. The supply manifold 100 is provided on an outer side in the −y direction of the pressure chambers 12, and the circulation manifold 110 is provided on an outer side in the +y direction of the pressure chambers 12.

The flow channel forming substrate 10 is provided with a first supply manifold unit 13 constituting the supply manifold 100, and a first circulation manifold unit 14 constituting the circulation manifold 110. The first supply manifold unit 13 communicates with a second supply manifold unit 32 provided to a communication plate 30 and with a third supply manifold unit 42 provided to a protection substrate 40 to be described later, thereby constituting the supply manifold 100 that serves as a common liquid chamber provided in common to the pressure chambers 12. The first circulation manifold unit 14 communicates with a second circulation manifold unit 33 provided to the communication plate 30 and with a third circulation manifold unit 43 provided to the protection substrate 40 to be described later, thereby constituting the circulation manifold 110 provided in common to the pressure chambers 12.

The first supply manifold unit 13 and the first circulation manifold unit 14 are continuously provided in the x-axis direction across a region where the pressure chambers 12 of the flow channel forming substrate 10 are formed, and are provided to penetrate the flow channel forming substrate 10 in the z-axis direction.

The flow channel forming substrate 10 is provided with ink supply channels 15 each of which establishes communication between the first supply manifold unit 13 and the corresponding pressure chamber 12. The ink supply channels 15 are individually provided to the respective pressure chambers 12 substantially at the same width as the pressure chambers 12, or preferably at a smaller width than the pressure chambers 12. Each ink supply channel 15 establishes communication between an end portion in the −y direction of each pressure chamber 12 and the first supply manifold unit 13 constituting the supply manifold 100. The ink in the supply manifold 100 is supplied to the respective pressure chambers 12 through the ink supply channels 15.

As mentioned above, the recording head 1 includes a supply flow channel which is provided with the supply manifold 100 and the ink supply channels 15, and is configured to supply the ink from the inside of the supply manifold 100 to the respective pressure chambers 12.

Meanwhile, the circulation manifold 110 communicates with the respective pressure chambers 12 through ink discharge channels 34 provided to the communication plate 30 to be described later. The ink in the respective pressure chambers 12 is discharged to the circulation manifold 110 at a predetermined timing through the ink discharge channels 34. Although illustration is omitted, the circulation manifold 110 communicates with the supply manifold 100, and is configured to able to return the ink in the circulation manifold 110 to the supply manifold 100 at a predetermined timing.

As mentioned above, the recording head 1 includes a circulation flow channel which is provided with the circulation manifold 110 and the ink discharge channels 34, and is configured to return the ink discharged from the pressure chambers 12 to the supply manifold 100.

In other words, the recording head 1 includes an ink flow channel that is provided with the supply flow channel and the circulation flow channel, and is also of a type referred to as a pressure chamber circulation head, for example, which is configured to be capable of circulating the ink in the ink flow channel through the pressure chambers 12.

A bonding substrate 200 at least including a nozzle plate 20 provided with nozzles 21 coupled to the pressure chambers 12 is located on the +z direction side of the flow channel forming substrate 10 that is provided with the ink flow channel including the pressure chambers 12 and the like. In the present embodiment, the bonding substrate 200 is formed from the communication plate 30 provided between the nozzle plate 20 and the flow channel forming substrate 10. Specifically, the communication plate 30 and the nozzle plate 20 collectively constituting the bonding substrate 200 are sequentially stacked on the +z direction side of the flow channel forming substrate 10.

The nozzles 21 corresponding to the respective pressure chambers 12 are formed in a line in the nozzle plate 20. Although the shape of each nozzle 21 is not limited to a particular shape, the nozzle 21 is formed into a so-called straight shape in the present embodiment. In other words, an inside diameter of each nozzle 21 is substantially constant throughout a length direction of the nozzle 21, which is equivalent to the z-axis direction.

Although a material of the nozzle plate 20 is not limited to a particular material, a relatively inexpensive polycrystalline silicon substrate may be favorably used, for example. Moreover, although a method of forming the nozzles 21 is not limited to a particular method, the nozzles 21 may preferably be formed by dry etching when the polycrystalline silicon substrate is used as the nozzle plate 20. In this way, the nozzles 21 in the straight shape can be formed in the nozzle plate 20 relatively easily.

Meanwhile, the single-crystal silicon substrate having the surface with the plane orientation of {110} plane, or a single-crystal silicon substrate having a surface with a plane orientation of {100} plane may be used as the material of the nozzle plate 20, for example.

In addition, it is also possible to use any of an SOI substrate, a glass substrate, various ceramic substrates, a metal substrate, and the like as the material of the nozzle plate 20, for example. Examples of the metal substrate include a stainless steel substrate and the like. In addition, an organic material such as polyimide resin can also be used as the material of the nozzle plate 20.

However, the material of the nozzle plate 20 may preferably have a thermal expansion coefficient close to that of the communication plate 30. In this way, it is possible to suppress warpage of the nozzle plate 20 and the communication plate 30 attributed to a difference in thermal expansion coefficient when temperatures of the nozzle plate 20 and the communication plate 30 are changed.

The communication plate 30 is provided with nozzle communication channels 31 that couple the respective pressure chambers 12 to the respective nozzles 21 one by one. While details will be described later, a shape of these nozzle communication channels 31 is one of characteristic features of the present disclosure. The communication plate 30 is also provided with the second supply manifold unit 32 that constitutes the supply manifold 100 together with the first supply manifold unit 13 provided to the flow channel forming substrate 10.

The communication plate 30 is further provided with the second circulation manifold unit 33 that constitutes the circulation manifold 110 together with the first circulation manifold unit 14 provided to the flow channel forming substrate 10, and the ink discharge channels 34 that establish communication between this second circulation manifold unit 33 and the respective pressure chambers 12.

The second supply manifold unit 32, the second circulation manifold unit 33, and the ink discharge channels 34 are opened to a surface in on the −z direction side of the communication plate 30 without penetrating the communication plate 30 in the z-axis direction. Meanwhile, the second supply manifold unit 32 and the second circulation manifold unit 33 are continuously provided across a region where the pressure chambers 12 are formed in the x-axis direction. The ink discharge channels 34 are provided independently of one another so as to correspond to the respective pressure chambers 12, and establish communication between end portions in the +y direction of the respective pressure chambers 12 and the second circulation manifold unit 33 that constitutes the circulation manifold 110.

Now, the shape of the nozzle communication channel 31 will be described further in detail. The nozzle communication channel 31 penetrates the communication plate 30 in the z-axis direction and establishes communication between each pressure chamber 12 and the corresponding nozzle 21. Moreover, as illustrated in FIG. 5, the nozzle communication channel 31 is formed from a pair of first inner wall surfaces 31a that constitute wall surfaces in the x-axis direction being the first direction, and a pair of second inner wall surfaces 31b that constitute wall surfaces in the y-axis direction being a second direction orthogonal to the x-axis direction.

In the present embodiment, the communication plate 30 is formed from a single-crystal silicon substrate having the surface with the plane orientation of (110) plane as with the flow channel forming substrate 10, and the nozzle communication channels 31 are formed by subjecting this single-crystal silicon substrate to the anisotropic wet etching.

Accordingly, the shape of the opening of each nozzle communication channel 31 is formed substantially into a parallelogram. The wall surfaces on the long side of each nozzle communication channel 31, namely, the first inner wall surfaces 31a constituting the wall surfaces in the x-axis direction are formed from first (111) plane that is perpendicular to the surface of the communication plate 30 being of (110) plane. Meanwhile, the wall surfaces on a short side of each nozzle communication channel 31, namely, the second inner wall surfaces 31b constituting the wall surfaces in the y-axis direction are formed from second (111) plane that is perpendicular to (110) plane and intersects with the first (111) plane at a predetermined angle.

In other words, the first inner wall surfaces 31a of the nozzle communication channel 31 are formed from surfaces that are substantially perpendicular to a liquid ejecting surface where the nozzle 21 is opened, namely, a surface of the nozzle plate 20 in the present embodiment. That is to say, an angle $\theta 1$ of each first inner wall surface 31a relative to the liquid ejecting surface is set substantially into a right angle (see FIG. 4 and the like).

On the other hand, each second inner wall surface 31b of the nozzle communication channel 31 is formed into an inclined surface such that a length in the y-axis direction of the nozzle communication channel 31 becomes gradually shorter toward the nozzle 21, or in other words, gradually shorter toward the +z direction side (see FIG. 3). Accordingly, an angle $\theta 2$ of each second inner wall surface 31b relative to the liquid ejecting surface, which is the angle relative to the surface of the nozzle plate 20 where the nozzle 21 is opened in the present embodiment, is set smaller than the angle $\theta 1$ of the first inner wall surface 31a relative to the liquid ejecting surface. As described above, the second inner wall surface 31b is formed from the second (111) plane that is inclined at the predetermined angle relative to the first (111) plane. As a consequence, the inclination angle $\theta 2$ in the y-axis direction of the second inner wall surface 31b relative to the liquid ejecting surface is set substantially equal to 30 degrees (see FIG. 6).

An opening width on the pressure chamber 12 side of the nozzle communication channel 31 in the x-axis direction is smaller than an opening width on the nozzle communication channel 31 side of the pressure chamber 12. Moreover, an opening width on the nozzle 21 side of the nozzle communication channel 31 is larger than an opening width on the nozzle communication channel 31 side of the nozzle 21.

In the present embodiment, each of the first inner wall surfaces 12a of the pressure chambers 12 and the first inner wall surfaces 31a of the nozzle communication channels 31 is formed into the surface that is substantially perpendicular to the liquid ejecting surface. That is to say, widths of the first inner wall surfaces 12a of the pressure chambers 12 and of the nozzle communication channels 31 in the x-axis direction are substantially constant in the z-axis direction. The nozzles 21 are formed into the straight shape as mentioned above.

Accordingly, as illustrated in FIG. 4, a width W1 of each nozzle communication channel 31 is smaller than a width W2 of each pressure chamber 12. Meanwhile, the width W1 of the nozzle communication channel 31 is larger than an opening width W3 of each nozzle 21.

The communication between each pressure chamber 12 and each nozzle 21 through the nozzle communication channel 31 having the above-described shape makes it possible to improve a performance to discharge bubbles contained in the ink in the vicinity of the nozzle communication channel 31. Since the second inner wall surface 31b serving as the wall surface of the nozzle communication channel 31 in the y-axis direction being a direction of a flow of the ink is formed into the inclined surface, a flow velocity of the ink is apt to be increased in the vicinity of the nozzle communication channel 31. The flow velocity of the ink in the vicinity of the nozzle communication channel 31 is also apt to be increased when circulating the ink by conducting various cleaning operations including flushing, suction cleaning, pressure application cleaning, and the like, or through the circulation manifold 110. Thus, it is possible to improve the performance to discharge bubbles that remain in the vicinity of the nozzle communication channel 31. In other words, it is possible to keep the bubbles from remaining in the vicinity of the nozzle communication channel 31.

The nozzle communication channels 31 each formed from the first inner wall surfaces 31a and the second inner wall surfaces 31b as described above are arranged in <111> direction in the communication plate 30 that constitutes the bonding substrate 200. In the present embodiment, the nozzle communication channels 31 are arranged in the x-axis direction of the communication plate 30, which is (111) direction.

When the nozzle communication channels 31 are arranged in the (111) direction, the first inner wall surfaces 31a being substantially perpendicular to the liquid ejecting surface can be formed relatively easily by subjecting the single-crystal silicon substrate to be formed into the communication plate 30 to the anisotropic wet etching. Since the first inner wall surfaces 31a are set substantially perpendicular to the liquid ejecting surface, it is possible to locate the arranged the nozzle communication channels 31 at high density.

Here, the <111> direction not only includes the (111) direction but also includes (−111) direction, (1-11) direction, and (11-1) direction, for example. In other words, the <111> direction includes directions that are equivalent to the (111) direction.

Although the communication plate 30 is formed from the single-crystal silicon substrate having the surface with the plane orientation of (110) plane in the present embodiment, the material of the communication plate 30 is not limited to a particular material. Other silicon substrates such as a polycrystalline silicon substrate, an SOI substrate, and the like can also be used as the material of the communication plate 30.

However, the communication plate 30 may preferably adopt the material having a thermal expansion coefficient close to that of the flow channel forming substrate 10. In this way, it is possible to suppress warpage of the flow channel forming substrate 10 and the communication plate 30 attributed to a difference in thermal expansion coefficient when temperatures of the flow channel forming substrate 10 and the communication plate 30 are changed.

The second supply manifold unit 32, the second circulation manifold unit 33, and the ink discharge channels 34 provided to the communication plate 30 are also formed by subjecting the single-crystal silicon substrate to be formed into the communication plate 30 to the anisotropic wet etching as with the formation of the nozzle communication channels 31. Needless to say, the method of forming the nozzle communication channels 31, the second supply manifold unit 32, the second circulation manifold unit 33, and the ink discharge channels 34 is not limited to a particular method, and these constituents may be formed by the dry etching, for example.

A method of bonding the nozzle plate 20 to the communication plate 30, which collectively constitute the bonding substrate 200, is not limited to a particular method. Nevertheless, the nozzle plate 20 is preferably bonded to the communication plate 30 by room temperature bonding. Specifically, the nozzle plate 20 and the communication plate 30 may preferably be brought into close contact and bonded to each other without interposing an adhesive layer or the like in between. In this way, it is possible to keep the bubbles from remaining in a coupling portion between each nozzle communication channel 31 and the corresponding nozzle 21, that is, a bonding portion between the communication plate 30 and the nozzle plate 20 more appropriately.

In the present embodiment, the bonding substrate 200 is formed by bonding the nozzle plate 20 to the communication plate 30. Instead, the bonding substrate 200 may be formed from a single substrate. For example, the bonding substrate 200 may be made of the SOI substrate, and the nozzle plate 20 made of the polycrystalline silicon substrate or the like and the communication plate 30 made of the single-crystal silicon substrate having the surface with the plane orientation of {110} plane may be provided as integral components.

As illustrated in the enlarged view in FIG. 6, flow channel protection films 150 are provided on inner surfaces of the ink flow channels inclusive of the respective nozzle communication channels 31. Although the flow channel protection films 150 do not always have to be provided across the entire surfaces of the ink flow channels, the flow channel protection films 150 may preferably be provided at least on the second inner wall surfaces 31*b* of the nozzle communication channels 31.

Since each second inner wall surface 31*b* is formed into the inclined surface, the communication plate 30 made of the silicon substrate may be dissolved in the ink along with the increase in flow velocity of the ink in the vicinity of each nozzle communication channel 31. However, provision of the flow channel protection film 150 on the inner surface of the nozzle communication channel 31, or in particular, on the surface of the second inner wall surface 31*b* being the inclined surface, can suppress dissolution of the communication plate 30 in the ink.

Such a flow channel protection film 150 is formed from a single layer made of either a single material or a composite material having liquid resistance, or from a laminated film obtained by laminating two or more materials, for example. Here, the liquid resistance means etching resistance against the ink which is either an alkaline or an acidic liquid. The material having the liquid resistance for use in the flow channel protection film 150 includes either an oxide or a nitride of an element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y). In other words, the flow channel protection film 150 may be provided by forming either a single material or a composite material containing the oxide or the nitride of one of the above-mentioned elements into a single layer, or by laminating two or more materials into a laminate film. Needless to say, the material of the flow channel protection film 150 is not limited to these materials, but only needs to be a material that can suppress dissolution of the communication plate 30 in the ink.

Although a method of forming the flow channel protection film 150 is not limited to a particular method, the flow channel protection film 150 can be formed in accordance with atomic layer deposition (ALD), for example. According to the atomic layer deposition, it is possible to form the flow channel protection film 150 at a high film density and in a compact state, so that the flow channel protection film 150 can stick to an object such as the communication plate 30 excellently.

Meanwhile, a piezoelectric actuator 300 is provided on a surface of the flow channel forming substrate 10 on the opposite side from the bonding substrate 200, that is, a surface on the −z direction side while interposing a vibration plate 50 in between. This piezoelectric actuator 300 is provided so as to correspond to each of the pressure chambers 12.

The recording head 1 executes a recording operation to eject the ink from each nozzle 21 by flexurally deforming the vibration plate 50 while driving this piezoelectric actuator 300, and causing a change in pressure of the ink in the pressure chamber 12 with this deformation. Note that structures of the vibration plate 50 and the piezoelectric actuator 300 are not limited to particular structures and publicly known techniques are applicable. Accordingly, detailed explanations thereof will be omitted.

The protection substrate 40 is also bonded to the surface on the −z direction side of the flow channel forming substrate 10 by using an adhesive and the like. The protection substrate 40 includes a retaining portion 41 which is a space for protecting the piezoelectric actuator 300. The retaining portion 41 is formed into such a shape that can contain the piezoelectric actuators 300 arranged in the x-axis direction.

The protection substrate 40 is also provided with the third supply manifold unit 42, which communicates with the first supply manifold unit 13 provided to the flow channel forming substrate 10 and constitutes the supply manifold 100. This third supply manifold unit 42 is continuously provided across the region corresponding to the pressure chambers 12 arranged in the x-axis direction as with the first supply manifold unit 13.

The protection substrate 40 is further provided with the third circulation manifold unit 43, which communicates with the first circulation manifold unit 14 provided to the flow channel forming substrate 10 and constitutes the circulation manifold 110. This third circulation manifold unit 43 is continuously provided across the region corresponding to the pressure chambers 12 arranged in the x-axis direction as with the first circulation manifold unit 14.

The protection substrate 40 is also provided with through holes 44 penetrating the protection substrate 40 in z-axis direction, which are provided in regions opposed to the ink discharge channels 34 of the communication plate 30. Although the illustration is omitted, a lead electrode drawn out of each piezoelectric actuator 300 extends into each through hole 44, and the lead electrode is coupled to an external line in this through hole 44.

According to the recording head 1 of the present embodiment having the above-described configuration, the ink is taken out of a not-illustrated external ink supply unit, and the ink flow channels from the supply manifold 100 as well as the circulation manifold 110 to the nozzles 21 are filled with the ink. Then, a voltage is applied to each piezoelectric actuator 300 corresponding to the pressure chamber 12 through the external line. Thus, the vibration plate 50 is subjected to the flexural deformation together with the piezoelectric actuator 300 so as to increase the pressure in each pressure chamber 12, whereby ink droplets are ejected from each nozzle 21.

As described above, according to the recording head 1 of the present embodiment, the communication plate 30 constituting the bonding substrate 200 is provided with the nozzle communication channels 31 that establish communication between the pressure chambers 12 and the nozzles 21. Each nozzle communication channel 31 includes the pair of first inner wall surfaces 31*a* constituting the wall surfaces in the x-axis direction, and the pair of second inner wall surfaces 31*b* constituting the wall surfaces in the y-axis direction orthogonal to the x-axis direction. At least one of the second inner wall surfaces 31*b* includes the inclined surface which is inclined such that the length in the y-axis direction of the nozzle communication channel 31 becomes gradually shorter toward the nozzle 21. The angle of the inclined surface relative to the liquid ejecting surface where the nozzle 21 is opened is smaller than the angle of the first inner wall surface 31*a* relative to the liquid ejecting surface.

In this way, the flow velocity of the ink is increased in the vicinity of the nozzle communication channel 31. It is therefore possible to keep the bubbles from remaining in the vicinity of the nozzle communication channel 31. Since the flow velocity of the ink is increased, the bubbles remaining in the vicinity of the nozzle communication channel 31 can be appropriated removed by carrying out various cleaning operations or the ink circulation, for example.

The communication plate 30 constituting the bonding substrate 200 is preferably formed from the single-crystal silicon substrate having the surface with the plane orientation of {110} plane. Moreover, the nozzle communication channels 31 are preferably formed by subjecting this communication plate 30 to the anisotropic wet etching. The nozzle communication channels 31 are preferably arranged in the <111> direction on the communication plate 30 constituting the bonding substrate 200. In this way, it is possible to form the nozzle communication channels 31 relatively easily, which are defined by the first inner wall surfaces 31*a* that are substantially perpendicular to the liquid ejecting surface, so that the nozzle communication channels 31 can be arranged at the high density.

In addition, each second inner wall surface 31*b* being the inclined surface is preferably formed from {111} plane that is orthogonal to {110} plane of the communication plate 30 constituting the bonding substrate 200. In this way, the nozzle communication channels 31 in the desired shape can be formed relatively easily by subjecting the communication plate 30 made of the single-crystal silicon substrate to the anisotropic wet etching.

The recording head 1 preferably includes the supply flow channel which is provided with the supply manifold 100 communicating with the pressure chambers 12 and is configured to supply the ink from the supply manifold 100 to the respective pressure chambers 12, and the circulation flow channel which is provided with the circulation manifold 110 communicating with the pressure chambers 12 and is configured to return the ink discharged from the respective pressure chambers 12 to the circulation manifold 110 to the supply manifold. The recording head 1 including the supply flow channel and the circulation flow channel as described above can remove the bubbles in the vicinity of the nozzle communication channels 31 more appropriately by conducting the ink circulation.

When the recording head 1 is capable of circulating the ink, each of the second inner wall surfaces 31*b* of the nozzle communication channels 31 preferably includes the inclined surface. This makes it possible to remove the bobbles contained in the ink in the vicinity of the nozzle communication channels 31 more appropriately when conducting the ink circulation.

The opening width on the pressure chamber 12 side of the nozzle communication channel 31 is preferably smaller than the opening width on the nozzle communication channel 31 side of the pressure chamber 12. In this way, it is possible to generate a sufficient flow of the ink in the nozzle communication channel 31 while securing a sufficient volume of the pressure chamber 12. Moreover, the opening width on the nozzle 21 side of the nozzle communication channel 31 is preferably larger than the opening width on the nozzle communication channel 31 side of the nozzle 21. Thus, it is possible to keep the bubbles from remaining in the vicinity of a boundary between the nozzle 21 and the nozzle communication channel 31 more appropriately.

The bonding substrate 200 preferably includes the nozzle plate 20 which is made of the polycrystalline silicon substrate, located on the surface on the opposite side from the flow channel forming substrate 10, and provided with the nozzles 21. This configuration makes it possible to form the nozzles 21 relatively easily by the dry etching or the like, and to reduce manufacturing costs of the nozzle plate 20.

The bonding substrate 200 may include the nozzle plate 20 which is made of the single-crystal silicon substrate having the surface with the plane orientation of {100} plane or {110} plane, located on the surface on the opposite side from the flow channel forming substrate 10, and provided with the nozzles 21. This configuration makes it possible to form the nozzles 21 relatively easily by the anisotropic wet etching or the dry etching.

Moreover, the bonding substrate 200 may be made of the SOI substrate, and may include the nozzle plate 20, and the communication plate 30 which is made of the single-crystal silicon substrate having the surface with the plane orientation of {110} plane, located on the flow channel forming substrate 10 side of the nozzle plate 20, and is provided with the nozzle communication channels 31. This configuration makes it possible to form the bonding substrate 200 relatively easily and at low costs.

The flow channel protection film 150 is preferably formed on the surface of the second inner wall surface 31*b* being the inclined surface. This configuration can prevent the communication plate 30 made of the silicon substrate from being dissolved in the ink.

When the bonding substrate 200 includes the communication plate 30 provided with the nozzle communication channels 31 and the nozzle plate 20 provided with the nozzles 21, and when the communication plate 30 and the nozzle plate 20 are bonded together to form the bonding substrate 200, the communication plate 30 is preferably bonded to the nozzle plate 20 by the room temperature bonding. In this way, it is possible to keep the bubbles from remaining in the coupling portions of the nozzle communication channels 31 to the nozzles 21 more appropriately.

As described above, the recording head 1 according to the present embodiment is configured to supply the ink from the supply manifold 100 to the respective pressure chambers 12 through the ink supply channels 15, to discharge the ink from the respective pressure chambers 12 to the circulation manifold 110 through the ink discharge channels 34, and to return the ink from the circulation manifold 110 to the supply manifold 100. However, the configuration of the recording head 1 is not limited only to the foregoing. On the other way round, the ink may be supplied from the circulation manifold 110 to the respective pressure chambers 12 through the ink discharge channels 34, then the ink may be discharged from the respective pressure chambers 12 to the supply manifold 100 through the ink supply channels 15, and the ink in the supply manifold 100 may be returned to the circulation manifold 110.

Embodiment 2

Figure 7:
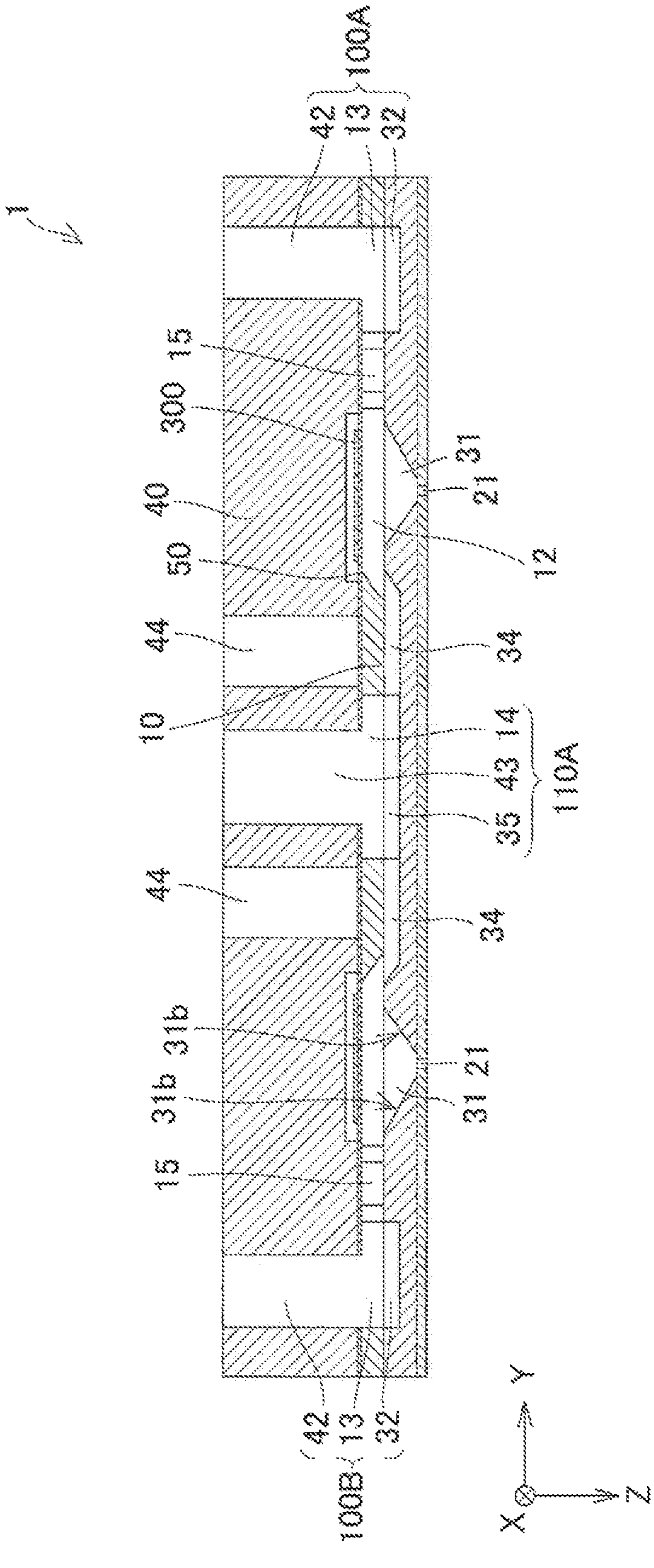
FIG. 7 is a sectional view of an ink jet recording head according to Embodiment 2.

FIG. 7 is a sectional view of a recording head according to Embodiment 2. The same constituents in FIG. 7 will be denoted by the same reference signs and overlapping explanations thereof will be omitted.

The present embodiment represents an example in which the recording head 1 includes two rows of the pressure chambers 12. Specifically, in the recording head 1 according to the present embodiment, the pressure chambers 12 are arranged in the x-axis direction as with the Embodiment 1, and two rows the pressure chambers 12 described above are arranged in the y-axis direction. Moreover, as illustrated in FIG. 7, two pressure chambers 12 are arranged in the y-axis direction in the flow channel forming substrate 10.

Two supply manifolds 100A and 100B are provided corresponding to the rows of the pressure chambers 12. The pressure chambers 12 in each of the rows are coupled to the corresponding one of the supply manifolds 100A and 100B through the ink supply channels 15.

A circulation manifold 110A is provided at a central portion in the y-axis direction of the flow channel forming substrate 10, that is, in a region between the two rows of the pressure chambers 12. This circulation manifold 110A is provided to the two rows of the pressure chambers 12 in common, and is coupled to the two rows of the pressure chambers 12 through the ink discharge channels 34.

At the time of the ink circulation, the ink is discharged from the pressure chambers 12 on the respective rows to the circulation manifold 110A through the ink discharge channels 34, and the ink in this circulation manifold 110A is returned to the supply manifolds 100A and 100B, respectively.

In the present embodiment as well, the second inner wall surface 31*b* of each of the nozzle communication channels 31 is formed into the inclined surface, which is inclined such that the length in the y-axis direction of the nozzle communication channel 31 becomes gradually shorter toward the nozzle 21 as with the Embodiment 1.

In this way, the flow velocity of the ink is increased in the vicinity of the nozzle communication channel 31. It is therefore possible to keep the bubbles from remaining in the vicinity of the nozzle communication channel 31 as with the Embodiment 1.

In the present embodiment, the circulation manifold 110A is provided in common to the two rows of the pressure chambers 12. Needless to say, the independent circulation manifolds 110A may be provided to the rows of the pressure chambers 12, respectively. Meanwhile, in the present embodiment, the two supply manifolds 100A and 100B are provided corresponding to each row of the pressure chambers 12, respectively. Instead, the supply manifold may be provided in common to the two rows of the pressure chambers 12. For example, the supply manifold may be continuously provided so as to surround three sides of the pressure chambers 12 arranged in the two rows, and used in common by the two rows of the pressure chamber 12.

Embodiment 3

Figure 8:
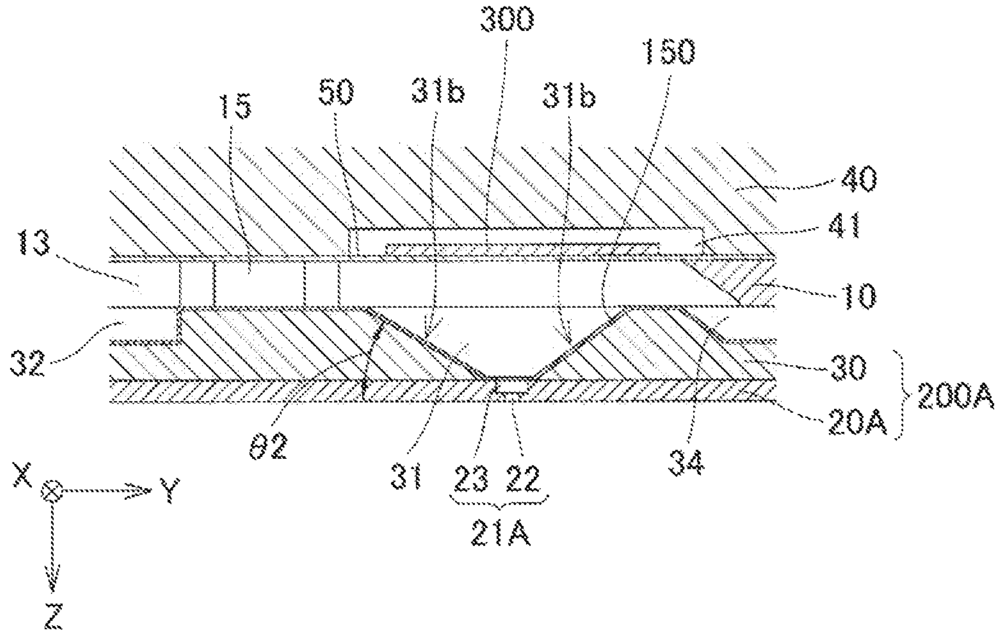
FIG. 8 is an enlarged sectional view illustrating a principal part of an ink jet recording head according to Embodiment 3.

FIG. 8 is an enlarged sectional view illustrating the vicinity of a nozzle communicating portion of a recording head according to Embodiment 3. The present embodiment represents a modified example of the bonding substrate, which is the same as the Embodiment 1 except that the shape of each nozzle is different. The same constituents in FIG. 8 will be denoted by the same reference signs and overlapping explanations thereof will be omitted.

As illustrated in FIG. 8, a nozzle 21A according to the present embodiment is formed from a first nozzle portion 22 provided on the +z direction side of a nozzle plate 20A, and a second nozzle portion 23 provided on the −z direction side of the nozzle plate 20A and having a larger diameter than that of the first nozzle portion 22.

Meanwhile, a bonding substrate 200A is formed by attaching the nozzle plate 20A provided with the nozzles 21A as described above to the communication plate 30 by using an adhesive and the like. Note that the method of bonding the nozzle plate 20A to the communication plate 30 is not limited to a particular method.

In the present embodiment as well, the second inner wall surface 31*b* of each of the nozzle communication channels 31 is formed into the inclined surface, which is inclined such that the length in the y-axis direction of the nozzle communication channel 31 becomes gradually shorter toward the nozzle 21A as with the Embodiment 1. The inclination angle $\theta 2$ in the y-axis direction of the second inner wall surface 31*b* relative to the liquid ejecting surface is set substantially equal to 30 degrees. In this way, the flow velocity of the ink is increased in the vicinity of the nozzle communication channel 31. It is therefore possible to keep the bubbles from remaining in the vicinity of the nozzle communication channel 31 as with the Embodiment 1.

Embodiment 4

Figure 9:
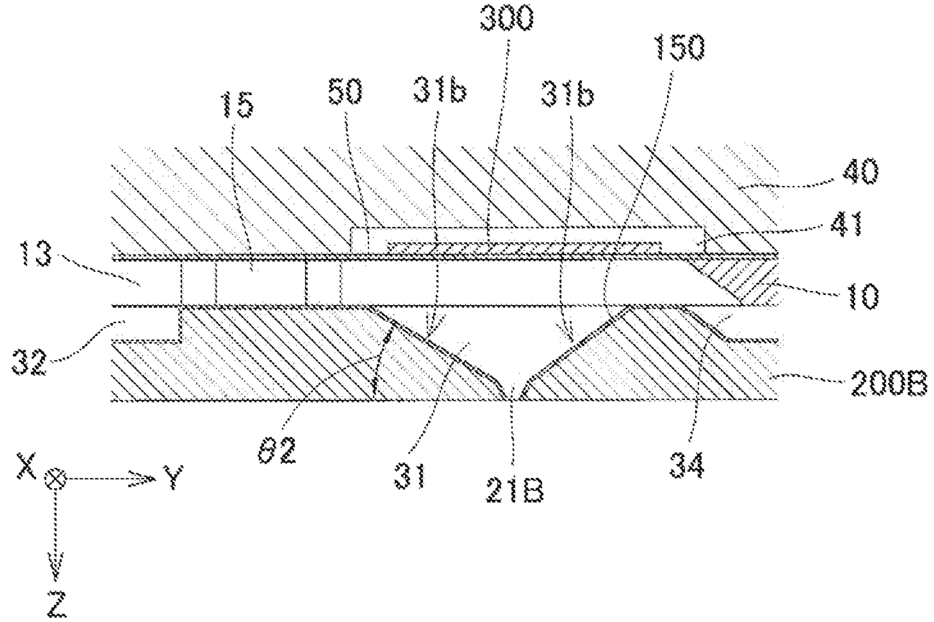
FIG. 9 is an enlarged sectional view illustrating a principal part of an ink jet recording head according to Embodiment 4.

FIG. 9 is an enlarged sectional view illustrating the vicinity of a nozzle communicating portion of a recording head according to Embodiment 4. The present embodiment represents a modified example of the bonding substrate, which is the same as the Embodiment 1 except that the bonding substrate is formed from a single substrate. The same constituents in FIG. 9 will be denoted by the same reference signs and overlapping explanations thereof will be omitted.

As illustrated in FIG. 9, a bonding substrate 200B according to the present embodiment is formed form the single substrate, and each nozzle 21B is formed continuously with the nozzle communication channel 31. To be more precise, the bonding substrate 200B is made of the single-crystal silicon substrate having the surface with the plane orientation of {110} plane, and the nozzles 21B are formed together with the nozzle communication channels 31 by subjecting the single-crystal silicon substrate to the anisotropic wet etching. As a consequence, an inside diameter of each nozzle 21B becomes gradually smaller toward the liquid ejecting surface, that is, toward the surface where the nozzle 21B of the bonding substrate 200B is opened.

In the present embodiment as well, the second inner wall surface 31*b* of each of the nozzle communication channels 31 is formed into the inclined surface, which is inclined such that the length in the y-axis direction of the nozzle communication channel 31 becomes gradually shorter toward the nozzle 21B as with the Embodiment 1. The inclination angle θ2 in the y-axis direction of the second inner wall surface 31*b* relative to the liquid ejecting surface is set substantially equal to 30 degrees. In this way, the flow velocity of the ink is increased in the vicinity of the nozzle communication channel 31. It is therefore possible to keep the bubbles from remaining in the vicinity of the nozzle communication channel 31 as with the Embodiment 1.

Embodiment 5

Figure 10:
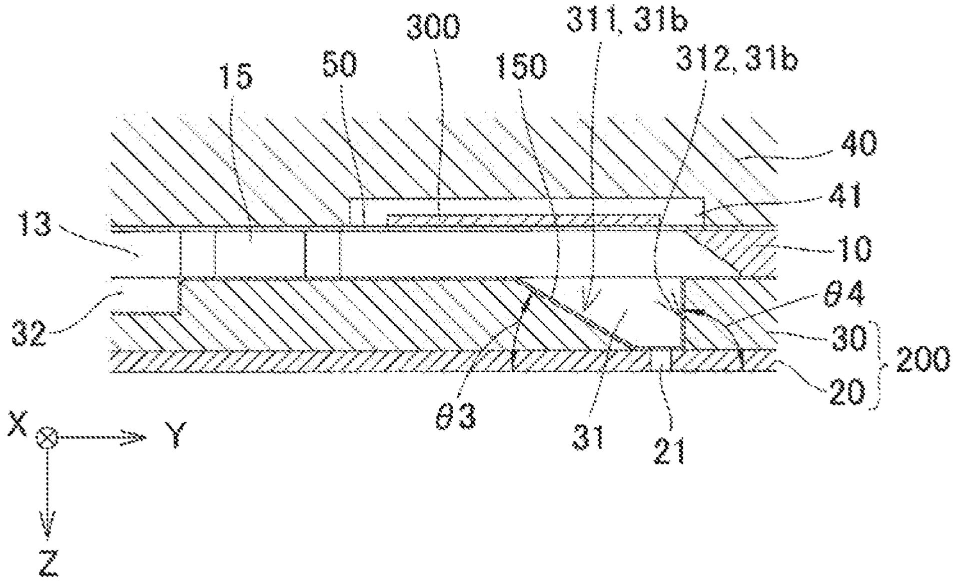
FIG. 10 is an enlarged sectional view of an ink jet recording head according to Embodiment 5.

FIG. 10 is a sectional view of a recording head according to Embodiment 5. The present embodiment represents a modified example of the nozzle communicating portion, which is the same as the Embodiment 1 except that the recording head does not include the circulation flow channel. The same constituents in FIG. 10 will be denoted by the same reference signs and overlapping explanations thereof will be omitted.

As illustrated in FIG. 10, the recording head 1 according to the present embodiment does not include the circulation manifold or the ink discharge channels to constitute the circulation flow channel. Hence, all of the ink supplied from the ink supply channels 15 to the respective pressure chambers 12 is ejected from the nozzles 21.

In the recording head 1 of the present embodiment as well, the second inner wall surface 31*b* of each of the nozzle communication channels 31 is formed into the inclined surface, which is inclined such that the length in the y-axis direction of the nozzle communication channel 31 becomes gradually shorter toward the nozzle 21 as with the Embodiment 1.

However, both of the two second inner wall surfaces 31*b* in the y-axis direction are formed into the inclined surfaces in the above-described embodiments, whereas only one of the second inner wall surfaces 31*b* is formed into the inclined surface in the present embodiment. To be more precise, only a second inner wall surface 311 (31*b*) located on the ink supply channel 15 side is formed into the inclined surface. A second inner wall surface 312 (31*b*) located on the opposite side from the ink supply channel 15 is formed substantially into a perpendicular surface to the surface of the nozzle plate 20 being the liquid ejecting surface. In other words, an angle θ3 of the second inner wall surface 311 (31*b*) relative to the liquid ejecting surface is smaller than an angle θ4 of the second inner wall surface 312 (31*b*) relative to the liquid ejecting surface.

In the present embodiment as well, the second inner wall surface 311 (31*b*) of each of the nozzle communication channels 31 is formed into the inclined surface, and the flow velocity of the ink is increased in the vicinity of the nozzle communication channel 31. It is therefore possible to keep the bubbles from remaining in the vicinity of the nozzle communication channel 31 as with the Embodiment 1.

In the recording head 1 of the present embodiment which does not include the circulation flow channel, the bubbles are likely to remain in the vicinity of the second inner wall surface 312 (31*b*) when every second inner wall surfaces 31*b* is formed into the inclined surface. It is therefore preferable to form only the second inner wall surface 311 (31*b*) into the inclined surface.

OTHER EMBODIMENTS

The embodiments of the present disclosure have been described above. It is to be noted, however, that the basic configuration of the present disclosure in not limited to the above-described examples.

For instance, the above-described embodiments depict an example of the configuration in which the entire surface of each second inner wall surface 31*b* of the nozzle communication channel 31 is formed into the inclined surface. However, the configuration of the second inner wall surface 31*b* is not limited only to the foregoing. Although the entire surface of the second inner wall surface 31*b* is preferably formed into the inclined surface, a certain portion of the second inner wall surface 31*b* may be formed into the inclined surface instead.

The above-described embodiments also depict an example of the main constituents of the recording head 1, which include the flow channel forming substrate 10, the bonding substrate 200 formed from the nozzle plate 20 and the communication plate 30, and the protection substrate 40. Needless to say, the recording head 1 may also include a substrate other than these constituents.

Figure 11:
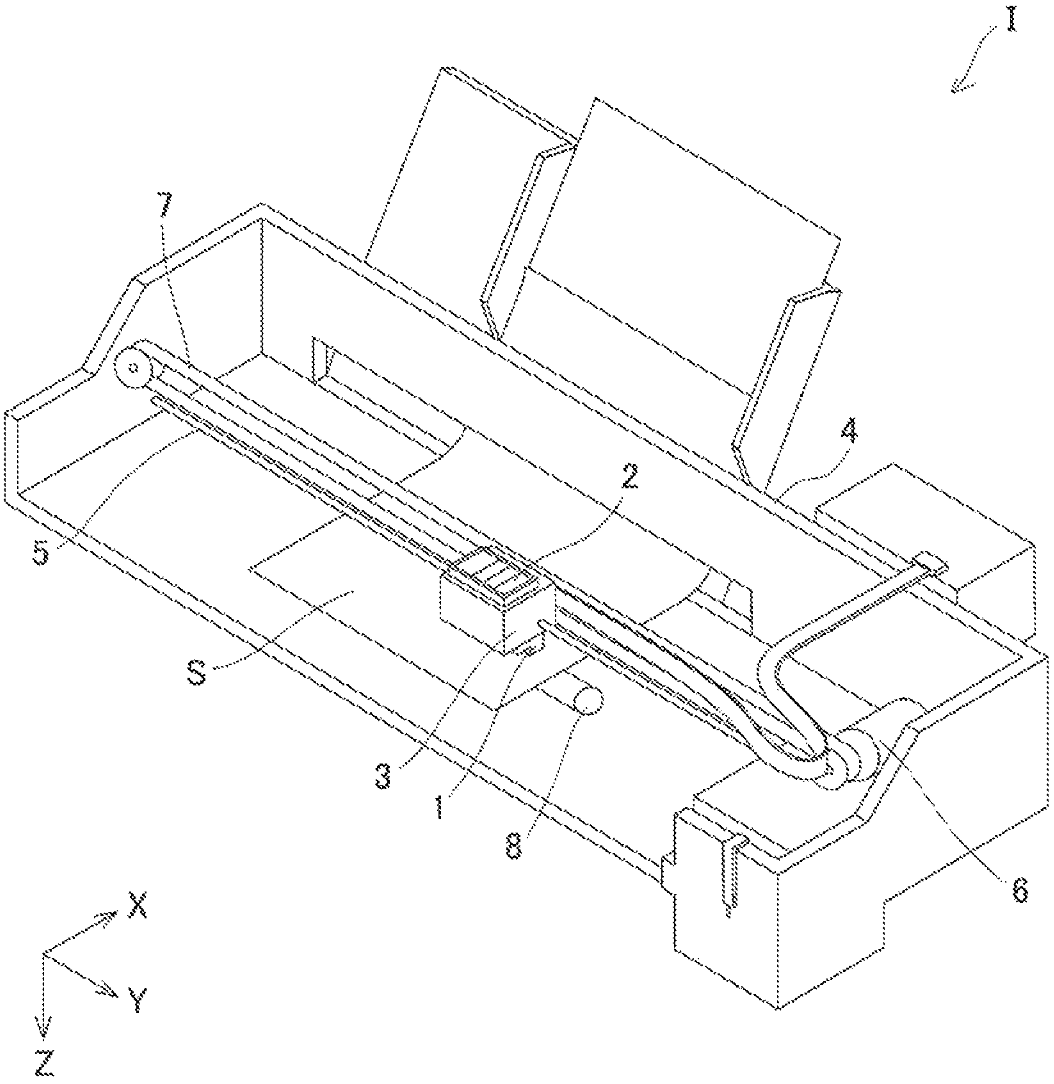
FIG. 11 is a diagram illustrating a schematic configuration of a recording apparatus according to an embodiment.

The ink jet recording head 1 of each of these embodiments is mounted on an ink jet recording apparatus I that represents an example of a liquid ejecting apparatus. FIG. 11 is a schematic diagram illustrating an example of the ink jet recording apparatus I.

In the ink jet recording apparatus I illustrated in FIG. 11, the recording head 1 is attachably and detachably provided with cartridges 2 each constituting an ink supply unit, and is mounted on a carriage 3. The carriage 3 mounting this recording head 1 is provided to be freely movable in an axial direction of a carriage shaft 5 attached to an apparatus body 4.

Then, the carriage 3 mounting the recording head 1 is caused to move along the carriage shaft 5 by transmitting driving force of a driving motor 6 to the carriage 3 through not-illustrated gears and a timing belt 7. Meanwhile, the apparatus body 4 is provided with a transportation roller 8 serving as a transportation unit, and a recording sheet S being a recording medium such as paper is transported by the transportation roller 8. Here, the transportation unit to transport the recording sheet S is not limited only to the transportation roller 8, and may be any of a belt, a drum, and the like.

The above-described ink jet recording apparatus I transports the recording sheet S in the x direction relative to the recording head 1, and ejects ink droplets from the recording head 1 while reciprocating the carriage 3 in the y axis relative to the recording sheet S, thus executing landing of the ink droplets, or so-called printing almost across the entire surface of the recording sheet S.

The above-described ink jet recording apparatus I depicts an example in which the recording head 1 is mounted on the carriage 3 and reciprocates in the y direction being a main scanning direction. However, the configuration of the ink jet recording apparatus is not limited only to this configuration. The ink jet recording apparatus may be a so-called line printing apparatus, which carries out printing only by moving the recording sheet S such as the paper in the x direction being a vertical scanning direction while fixing the recording head 1, for example. The present disclosure is also applicable to the ink jet recording apparatus having the above-described configuration.

The above-described embodiments have described the ink jet recording head as an example of the liquid ejecting head, and the ink jet recording apparatus as an example of the liquid ejecting apparatus. However, the present disclosure is targeted for broad ranges of the liquid ejecting heads and the liquid ejecting apparatuses as a whole. Naturally, the present disclosure is also applicable to liquid ejecting heads and liquid ejecting apparatus configured to eject liquids other than inks. Examples of such other liquid ejecting heads include various recording heads used for image recording apparatuses such as printers, a coloring material ejecting head used for manufacturing color filters for liquid crystal display units and the like, an electrode material ejecting head used for forming electrodes of organic EL display units, field emission display (FED) units, and the like, a bioorganic material ejecting head used for manufacturing biochips, and the like. The present disclosure is also applicable to a liquid ejecting apparatus that includes any of the aforementioned liquid ejecting heads.

What is claimed is:

1. A liquid ejecting head comprising:

a flow channel forming substrate including a plurality of pressure chambers arranged in a first direction; and a bonding substrate bonded to one surface side of the flow channel forming substrate, the bonding substrate at least including a nozzle plate provided with nozzles coupled to the pressure chambers, wherein the bonding substrate is provided with nozzle communication channels configured to establish communication between the pressure chambers and the nozzles, one of the nozzle communication channels includes a pair of first inner wall surfaces constituting wall surfaces in the first direction, and a pair of second inner wall surfaces constituting wall surfaces in a second direction being orthogonal to the first direction, at least one of the pair of second inner wall surfaces includes an inclined surface, an entirety of the inclined surface being inclined such that a length in the second direction of one of the nozzle communication channels becomes gradually shorter toward one of the nozzles, the inclined surface being inclined with respect to both a liquid ejecting surface on which the nozzles are opened and a third direction perpendicular to the liquid ejecting surface when viewed in the first direction, and an angle of the inclined surface relative to the liquid ejecting surface is smaller than an angle of one of the pair of first inner wall surfaces relative to the liquid ejecting surface.

2. The liquid ejecting head according to claim 1, wherein the bonding substrate provided with the nozzle communication channels is formed from a single-crystal silicon substrate having a surface with a plane orientation of {110} plane.

3. The liquid ejecting head according to claim 2, wherein the nozzle communication channels are arranged in <111> direction of the bonding substrate.

4. The liquid ejecting head according to claim 2, wherein the inclined surface is {111} plane intersecting with {110} plane of the bonding substrate.

5. A liquid ejecting head comprising:

a flow channel forming substrate including a plurality of pressure chambers arranged in a first direction;

a bonding substrate bonded to one surface side of the flow channel forming substrate, the bonding substrate at least including a nozzle plate provided with nozzles coupled to the pressure chambers;

a supply flow channel including a first common liquid chamber communicating with the plurality of pressure chambers, and being configured to supply a liquid from the first common liquid chamber to the pressure chambers; and a circulation flow channel including a second common liquid chamber communicating with the plurality of pressure chambers, and being configured to return the liquid discharged from the pressure chambers to the second common liquid chamber to the first common liquid chamber, wherein the bonding substrate is provided with nozzle communication channels configured to establish communication between the pressure chambers and the nozzles, one of the nozzle communication channels includes a pair of first inner wall surfaces constituting wall surfaces in the first direction, and a pair of second inner wall surfaces constituting wall surfaces in a second direction being orthogonal to the first direction, at least one of the pair of second inner wall surfaces includes an inclined surface being inclined such that a length in the second direction of one of the nozzle communication channels becomes gradually shorter toward one of the nozzles, and an angle of the inclined surface relative to a liquid ejecting surface on which the nozzles are opened is smaller than an angle of one of the pair of first inner wall surfaces relative to the liquid ejecting surface.

6. The liquid ejecting head according to claim 5, wherein each of the pair of second inner wall surfaces includes the inclined surface.

7. The liquid ejecting head according to claim 1, wherein an opening width on a side of one of the pressure chambers of one of the nozzle communication channels is smaller than an opening width on a side of one of the nozzle communication channels of one of the pressure chambers.

8. The liquid ejecting head according to claim 1, wherein an opening width on a side of one of the nozzles of one of the nozzle communication channels is larger than an opening width on a side of one of the nozzle communication channels of one of the nozzles.

9. The liquid ejecting head according to claim 1, wherein the bonding substrate includes the nozzle plate made of a polycrystalline silicon substrate, located on a surface on an opposite side from the flow channel forming substrate, and provided with the nozzles.

10. The liquid ejecting head according to claim 1, wherein the bonding substrate includes the nozzle plate made of a single-crystal silicon substrate having a surface with a plane orientation of any of {100} plane and {110} plane, located on a surface on an opposite side from the flow channel forming substrate, and provided with the nozzles.

11. The liquid ejecting head according to claim 9, wherein the bonding substrate is made of a silicon-on-insulator substrate, and includes the nozzle plate, and a communication plate made of a single-crystal silicon substrate having a surface with a plane orientation of {110} plane, located on a side of the flow channel forming substrate-side of the nozzle plate, and provided with the nozzle communication channels.

12. The liquid ejecting head according to claim 1, wherein a flow channel protection film is formed at a surface of the inclined surface.

13. The liquid ejecting head according to claim 1, wherein an inside diameter of one of the nozzles is substantially constant throughout a length direction of one of the nozzles.

14. The liquid ejecting head according to claim 1, wherein an inside diameter of one of the nozzles becomes gradually smaller toward the liquid ejecting surface.

15. A liquid ejecting apparatus comprising the liquid ejecting head according to claim 1.

16. The liquid ejecting head according to claim 1, wherein the pair of first inner wall surfaces face each other in the first direction, and the pair of second inner wall surfaces face each other in the second direction.

17. The liquid ejecting head according to claim 1, wherein one of the pressure chambers is elongated in the second direction.

18. The liquid ejecting head according to claim 1, wherein the pair of first inner wall surfaces extends perpendicular to the liquid ejecting surface.

19. The liquid ejecting head according to claim 1, wherein an opening width on a side of one of the pressure chambers of one of the nozzle communication channels regarding the second direction is larger than an opening width on a side of one of the pressure chambers of one of the nozzle communication channels regarding the first direction, when viewed in the third direction.

20. The liquid ejecting head according to claim 1, wherein an opening width on a side of one of the pressure chambers of one of the nozzle communication channels regarding the second direction is larger than a length of one of the nozzle communication channels regarding the third direction.

* * * * *